(12) United States Patent
VanBlon et al.

(10) Patent No.: US 10,042,543 B2
(45) Date of Patent: Aug. 7, 2018

(54) INDICATING A WORD LENGTH USING AN INPUT DEVICE

(71) Applicant: LENOVO (Singapore) PTE, LTD., New Tech Park (SG)

(72) Inventors: Russell Speight VanBlon, Raliegh, NC (US); John Carl Mese, Cary, NC (US); Nathan J. Peterson, Durham, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 567 days.

(21) Appl. No.: 14/030,604

(22) Filed: Sep. 18, 2013

(65) Prior Publication Data
US 2015/0082158 A1    Mar. 19, 2015

(51) Int. Cl.
*G06F 17/00* (2006.01)
*G06F 3/0488* (2013.01)
*G06F 17/27* (2006.01)

(52) U.S. Cl.
CPC .......... *G06F 3/0488* (2013.01); *G06F 17/276* (2013.01)

(58) Field of Classification Search
CPC .. G06F 17/2765; G06F 3/0412; G06F 17/276; G06F 3/0484; G06F 3/0237; G06F 3/04886; G06F 17/273; G06F 3/04842; G06F 3/0488; G06F 3/0485; G06F 3/04883; G06F 3/02; G06F 3/017; G06F 3/044; G06F 3/0416

USPC ........................................................ 715/261
See application file for complete search history.

(56) References Cited

U.S. PATENT DOCUMENTS

| | | | |
|---|---|---|---|
| 2005/0169527 A1* | 8/2005 | Longe | G06F 3/0237 382/177 |
| 2005/0210402 A1* | 9/2005 | Gunn | G06F 3/0236 715/773 |
| 2005/0262451 A1* | 11/2005 | Remignanti | G06F 3/04847 715/833 |
| 2006/0242607 A1* | 10/2006 | Hudson | G06F 3/04817 715/863 |
| 2008/0189605 A1* | 8/2008 | Kay | G06F 3/0237 715/257 |
| 2009/0009367 A1* | 1/2009 | Hirshberg | G06F 3/0237 341/22 |
| 2009/0213134 A1* | 8/2009 | Stephanick | G06F 3/0236 345/589 |
| 2012/0268382 A1* | 10/2012 | Raguseo | G06F 3/0237 345/168 |
| 2013/0063361 A1* | 3/2013 | Pasquero | G06F 3/0237 345/173 |
| 2014/0108992 A1* | 4/2014 | Bi | G06F 17/276 715/773 |
| 2014/0201671 A1* | 7/2014 | Zhai | G06F 3/0237 715/773 |

(Continued)

*Primary Examiner* — Scott Baderman
*Assistant Examiner* — Jason Edwards
(74) *Attorney, Agent, or Firm* — Kunzler, PC (57) ABSTRACT

A method, apparatus, and program product are disclosed for receiving an input from an input device, determining one or more characteristics of the received input, the one or more characteristics indicating a word length, and presenting a list of one or more words having word lengths determined according to the indicated word length.

15 Claims, 8 Drawing Sheets

(56) References Cited

U.S. PATENT DOCUMENTS

2014/0282201 A1* 9/2014 Pasquero .............. G06F 3/0237
 715/773
2015/0253856 A1* 9/2015 de los Reyes ...... G06F 3/04883
 345/174

* cited by examiner

INDICATING A WORD LENGTH USING AN INPUT DEVICE

BACKGROUND

Field

The subject matter disclosed herein relates to virtual keyboard input and more particularly relates to indicating a word length using an input device.

Description of the Related Art

Virtual keyboards are present in many information handling devices and are generally interacted with by an input device, e.g., a mouse, a track pad, a stylus, etc. For example, devices that provide touch-enabled displays, such as smart phones, tablets, laptops, etc., often include a virtual keyboard that a user may interact with to enter characters, similar to a physical keyboard. However, instead of pressing physical keys on a keyboard, the user taps the keys displayed on the touch-enabled display with a stylus, finger, etc., or with a cursor controlled by a mouse, track pad, etc. This may be convenient for mobile devices that do not provide a physical keyboard. However, entering characters on a virtual keyboard may be slow and tedious, especially while holding a device in both hands, which may only allow characters to be entered using one or two fingers.

In certain instances, a user may switch to a new virtual keyboard or install a new virtual keyboard on their device, but this often requires changing devices or modifying an existing device. Moreover, some custom virtual keyboards require every character in a word to be typed, which may be slow and cumbersome, especially when entering longer words. While some virtual keyboards may provide type-ahead functionality, where possible words may be presented based on the characters that have been entered, these methods may be inefficient where the language includes a large vocabulary or many different combinations of words.

BRIEF SUMMARY

A method for indicating a word length using an input device is disclosed. An apparatus and computer program product also perform the functions of the method.

In one embodiment, a method is described that includes receiving an input from an input device. In another embodiment, the method includes determining one or more characteristics of the received input. In some embodiments, the one or more characteristics indicate a word length. In a further embodiment, the method includes presenting a list of one or more words having word lengths determined according to the indicated word length.

The method, in some embodiments, includes updating the list of one or more words in response to modification of one or more characteristics of the received input. In another embodiment, the indicated word length is modified in response to modification of one or more characteristics of the received input. In certain embodiments, the word lengths of the one or more presented words substantially corresponds to the indicated word length. In a further embodiment, the method includes assigning a word length to one or more characteristics of the received input. In one embodiment, the word length is assigned based on one or more usage patterns associated with the received input.

In a further embodiment, the method includes subdividing the view area of the touch-enabled display into one or more segments. In some embodiments, each segment represents a word length such that the lengths of the one or more listed words is updated as the received input moves into a different word length segment. In certain embodiments, subdividing the view area of the touch-enabled display comprises either linearly subdividing the view area or logarithmically subdividing the view area based on one or more usage patterns associated with the received input.

In one embodiment, the received input includes a swiping gesture having one or more characteristics indicating a word length. In a further embodiment, the one or more characteristics of the swiping gesture include a swiping distance and/or a swiping speed. In another embodiment, the received input gesture includes a hovering gesture having one or more characteristics indicating a word length. In some embodiments, the one or more characteristics of the hovering gesture include a duration, a perpendicular distance between the hovering item and the touch-enabled display, and/or a parallel distance between a hovering gesture start position and a hovering gesture end position. In another embodiment, the received input gesture includes a tap-and-hold gesture having one or more characteristics indicating a word length. In certain embodiments, the one or more characteristics of the tap-and-hold gesture include a duration and/or a force.

In another embodiment, the method includes tracking the usage frequency of one or more words having a particular length. In some embodiments, the list of one or more words is sorted based on a usage frequency distribution such that more-frequently used words are listed before less-frequently used words. In a further embodiment, the input is received from a virtual keyboard, which is presented on a touch-enabled display of an information handling device. In one embodiment, the one or more words presented in the list begin with one or more characters entered on the virtual keyboard. In a further embodiment, the order of the one or more entered characters is preserved in the one or more listed words.

The apparatus, in one embodiment, includes a processor and a memory storing machine readable code executable by the processor. In one embodiment, the machine readable code includes an input reception module configured to receive an input from an input device. In a further embodiment, the machine readable code includes a characteristic determination module configured to determine one or more characteristics of the received input. In certain embodiments, the one or more characteristics indicate a word length. In one embodiment, the machine readable code includes a word presentation module configured to present a list of one or more words having word lengths determined according to the indicated word length.

The machine readable code, in another embodiment, includes an update module configured to update the list of one or more words in response to modification of one or more characteristics of the received input. In one embodiment, the indicated word length is modified in response to modification of one or more characteristics of the received input. In a further embodiment, the word lengths of the one or more presented words substantially corresponding to the indicated word length. In certain embodiments, the machine readable code includes an assignment module configured to assign a word length to one or more characteristics of the received input. In one embodiment, the word length is assigned based on one or more usage patterns associated with the received input.

The machine readable code, in another embodiment, includes a subdividing module configured to subdivide the view area of the touch-enabled display into one or more segments. In one embodiment, each segment represents a word length such that the lengths of the one or more listed words is updated as the received input moves into a different word length segment.

In another embodiment, the received input includes a swiping gesture having one or more characteristics indicating a word length. In a further embodiment, the one or more characteristics of the swiping gesture include a swiping distance and/or a swiping speed. In another embodiment, the received input includes a hovering gesture having one or more characteristics indicating a word length. In some embodiments, the one or more characteristics of the hovering gesture include a duration, a perpendicular distance between the hovering item and the touch-enabled display, and/or a parallel distance between a hovering gesture start position and a hovering gesture end position. In another embodiment, the received input includes a tap-and-hold gesture having one or more characteristics indicating a word length. In certain embodiments, the one or more characteristics of the tap-and-hold gesture include a duration and/or a force.

The machine readable code, in one embodiment, includes a tracking module configured to track the usage frequency of one or more words having a particular length. In another embodiment, the list of one or more words being sorted based on a usage frequency distribution such that more-frequently used words are listed before less-frequently used words. In a further embodiment, the input is received from a virtual keyboard, which is presented on a touch-enabled display of an information handling device. In some embodiments, the one or more words presented in the list begin with one or more characters entered on the virtual keyboard. In one embodiment, the order of the one or more entered characters is preserved in the one or more listed words.

A program product is disclosed including a computer readable storage medium storing machine readable code executable by a processor to perform the operations. In one embodiment, the operations include receiving an input from an input device. In another embodiment, the operations include determining one or more characteristics of the received input. In some embodiments, the one or more characteristics indicate a word length. In a further embodiment, the operations include presenting a list of one or more words having word lengths determined according to the indicated word length.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
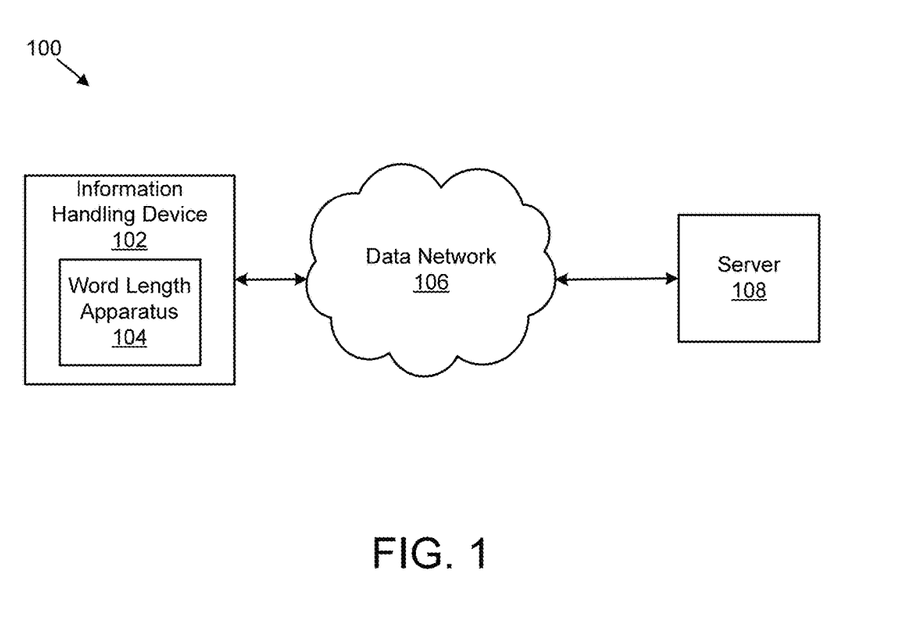
FIG. 1 is a schematic block diagram illustrating one embodiment of a system for indicating a word length using an input device in accordance with the present subject matter.

Descriptions of Figures may refer to elements described in previous Figures, like numbers referring to like elements. FIG. 1 depicts one embodiment of a system 100 for indicating a word length using an input device. In an embodiment, the system 100 includes an information handling device 102, a word length apparatus 104, a data network 106, and a server 108, which are described in more detail below.

In one embodiment, the system 100 includes an information handling device 102. In some embodiments, the information handling device 102 receives input from an input device, such as a mouse, joystick, track pad, and/or the like. The information handling device 102, in certain embodiments, includes a touch-enabled display that recognizes and receives input from a touch input device, such as a stylus, a user's finger, and/or the like. In some embodiments, the information handling device 102 includes a mobile device, such as a smart phone, tablet computer, PDA, and/or the like. In another embodiment, the information handling device 102 includes a laptop computer, a desktop computer, a smart TV, and/or the like. The information handling device 102, in a further embodiment, includes a virtual keyboard, as illustrated in FIGS. 4A-6. The virtual keyboard, in certain embodiments, includes an on-screen keyboard, which is interacted with using a touch-enabled display, a projection keyboard, a mouse, a track pad, and/or the like.

In one embodiment, the system 100 includes a word length apparatus 104, which is configured to receive an input gesture from an input device. In another embodiment, the word length apparatus 104 determines one or more characteristics associated with the received input, which indicates a word length. The word length apparatus 104, in another embodiment, presents a list of one or more words that have word lengths determined according to the indicated word length. The word length apparatus 104, in one embodiment, includes one or more modules that perform the operations associated with indicating a word length using an input device. The word length apparatus 104, including its associated modules, are described in more detail below with reference to FIGS. 2 and 3.

In another embodiment, the system 100 includes a data network 106. The data network 106, in certain embodiments, is a digital communication network 106 that transmits digital communications related to indicating a word length using an input device. The digital communication network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, and/or the like. In certain embodiments, the server 108 includes at least a portion of the word length apparatus 104. In another embodiment, the information handling device 102 is communicatively coupled to the server 108 through the data network 106. The information handling device 102, in some embodiments, obtains at least a portion of its data from the server 108, including dictionaries, spell checking data, prediction data, and/or the like. In another embodiment, the information handling device 102 offloads at least a portion of the information processing related to indicating a word length using an input device (e.g., input and/or gesture detection processing, dictionary lookups, and/or the like) to the server 108.

Figure 2:
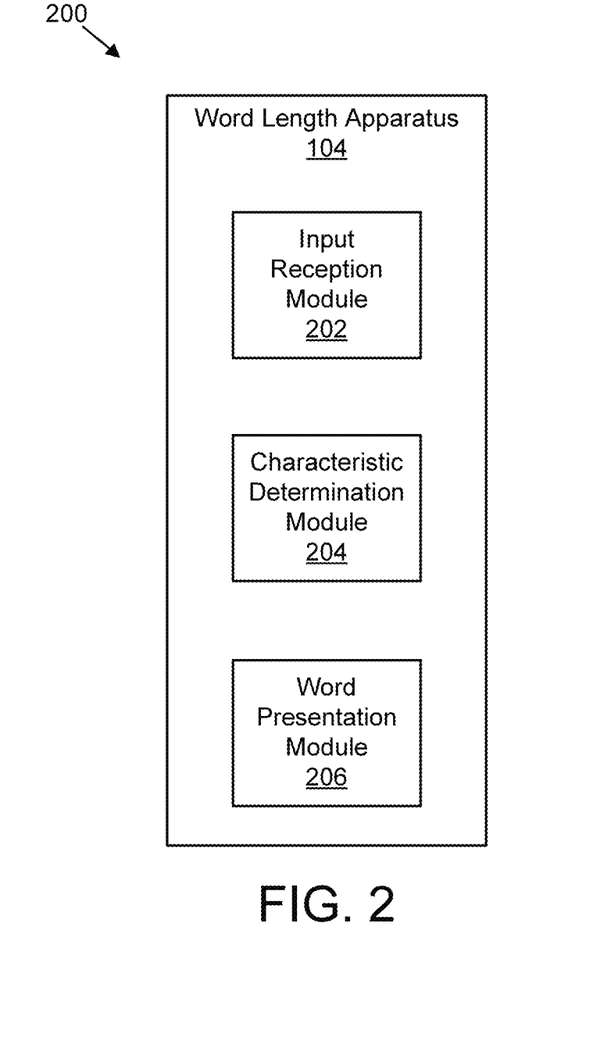
FIG. 2 is a schematic block diagram illustrating one embodiment of an apparatus for indicating a word length using an input device in accordance with the present subject matter.

FIG. 2 depicts one embodiment of an apparatus 200 for indicating a word length using an input device. In certain embodiments, the apparatus 200 includes a word length apparatus 104. The word length apparatus 104, in another embodiment, includes an input reception module 202, a characteristic determination module 204, and a word presentation module 206, which are described below in more detail. In certain embodiments, at least a portion of the word length apparatus 104 can be incorporated into third-party virtual keyboard software applications, such as Swype®, SwiftKey, and/or the like.

The word length apparatus 104, in one embodiment, includes an input reception module 202 configured to receive an input from an input device. In certain embodiments, the input device includes a touch-enabled display, a keyboard, a mouse, a track pad, and/or the like. In another embodiment, the input reception module 202 receives input from a user interacting with a software input component of the information handling device 102, such as a virtual keyboard. In some embodiments, the virtual keyboard is presented on a display of an information handling device 102, which may also be a touch-enabled display. In another embodiment, the virtual keyboard is a projection keyboard, which is projected onto a surface by the information handling device 102. In such an embodiment, the information handling device 102 records a keystroke/gesture when the user touches the surface covered by an image of a key.

In one embodiment, the input received by the input reception module 202 includes a swiping gesture. In some embodiments, the swiping gesture includes swiping a cursor across a display of the information handling device 102 using a mouse or a track pad. For example, a user entering characters on a virtual keyboard using a mouse may click and hold on a letter while moving the cursor in a direction away from the letter with the mouse, thus creating a swiping gesture. Similarly, a user may click and hold on a letter of a virtual keyboard using a finger on a track pad while moving the cursor in a direction away from the letter with their finger to create a swiping gesture. The swiping gesture, in certain embodiments, is performed by a user using a touch input item, such as a stylus, finger, and/or the like, on a touch-enabled display. The touch input item may be swiped across at least a portion of the touch-enabled display, beginning with a particular character on the virtual keyboard, and travelling a certain distance across the display.

In another embodiment, the input received by the input reception module 202 includes a hovering gesture. The hovering gesture, in certain embodiments, is performed by a user hovering a touch input item a certain distance above the touch-enabled display of the information handling device 102. In another embodiment, the hovering gesture is performed by hovering a touch input item a certain distance over an input device, such as hovering a finger over a track pad. In one embodiment, the input reception module 202 receives a tap-and-hold gesture. The tap-and-hold gesture, in some embodiments, is performed by a user tapping the touch-enabled display with a touch input item and holding the tap for a particular duration. Similarly, in another embodiment, the user performs the tap-and-hold gesture on a track pad by tapping the track pad while the cursor is over a letter on the virtual keyboard and holding the tap for a particular duration. One of skill in the art will recognize other input gestures that may be received by an input reception module 202.

In some embodiments, the input reception module 202 also receives secondary input gestures, which include gestures to scroll through a list of words presented by the word presentation module 206. For example, the input reception module 202 may receive a parallel swiping gesture, which may indicate a particular word length, and also a perpendicular swiping gesture, which may scroll the list of words. The input gesture in this example would comprise one single input gesture without requiring the user to lift their finger or stylus off the touch-enabled screen or similar input device. In another embodiment, the secondary gesture may include a circular gesture, which would scroll through the list of words instead of a linear (e.g., left-to-right, up-down) motion.

In another embodiment, the word length apparatus 104 includes a characteristic determination module 204 configured to determine one or more characteristics of the received input. The one or more characteristics of the received input, in certain embodiments, indicates a word length. In one embodiment, the one or more characteristics associated with a swiping gesture includes a swiping distance, a swiping speed, and/or the like. For example, the length of a swiping gesture received by the input reception module 202 may indicate a word length of one or more potential words displayed by the word presentation module 206 described below. In such an embodiment, the swiping distance is determined from the linear distance of the swiping gesture. In another embodiment, the swiping distance is determined by the total swiping distance and not necessarily linearly related to the swiping gesture. Alternatively, the speed with which the swiping gesture is performed may indicate a word length, where a quicker swiping gesture indicates a shorter word length and a slower swiping gesture indicates a longer word length, or vice versa.

In another embodiment where the input gesture is a hovering gesture, the one or more characteristics of the hovering gesture include a hover duration, a perpendicular distance between the hovering touch input item and the touch-enabled display, a distance parallel to the touch-enabled display between a hover gesture start position and a hover gesture end position, and/or the like. In certain embodiments that include receiving a tap-and-hold gesture, the one or more characteristics of the tap-and-hold gesture include a tapping duration, a tapping force, a size of the tap, and/or the like. One of skill in the art will recognize other characteristics associated with different input gestures that may indicate a word length.

In one embodiment, the word length apparatus 104 includes a word presentation module 206 configured to present a list of one or more words having word lengths determined according to the indicated word length. In certain embodiments, the word presentation module 206 presents a list of one or more words that have lengths substantially corresponding to the word length indicated by the one or more characteristics of the received input gesture. In one embodiment, the word presentation module 206 presents the list of one or more words in a selectable pop-up list that is visible when the user begins an input gesture and is hidden after the user selects a word in the list and/or cancels the input gesture. In some embodiments, the word presentation module 206 dynamically updates the list of one or more words based on the input gesture being modified, which indicates a change in the indicated word length.

In one embodiment, the word presentation module 206 presents one or more words that begin with one or more characters entered by the user. For example, if the letters "he" have been entered on the virtual keyboard and an input gesture begins on the letter "l," such as a swiping gesture, the word presentation module 206 may display one or more words that begin with the letters "hel," and have a word length that substantially corresponds to the word length indicated by the swiping gesture. In some embodiments, the order of the entered characters is preserved in the one or more words listed by the word presentation module 206. In another embodiment, the word presentation module 206 sorts the list of words according to a predetermined sorting scheme, such as alphabetically ascending or descending, by a usage frequency distribution, by context, by relevance, by popularity, or the like. FIGS. 4A-6 depict in more detail the operations of the input reception module 202, the characteristic determination module 204, and the word presentation module 206.

In certain embodiments, if the word presentation module 206 determines that there is only one possible word to be displayed in the list, the word presentation module 206 will select the word for the user. In another embodiment, the word presentation module 206 may select a word for the user based on the context of one or more previously entered words.

Figure 3:
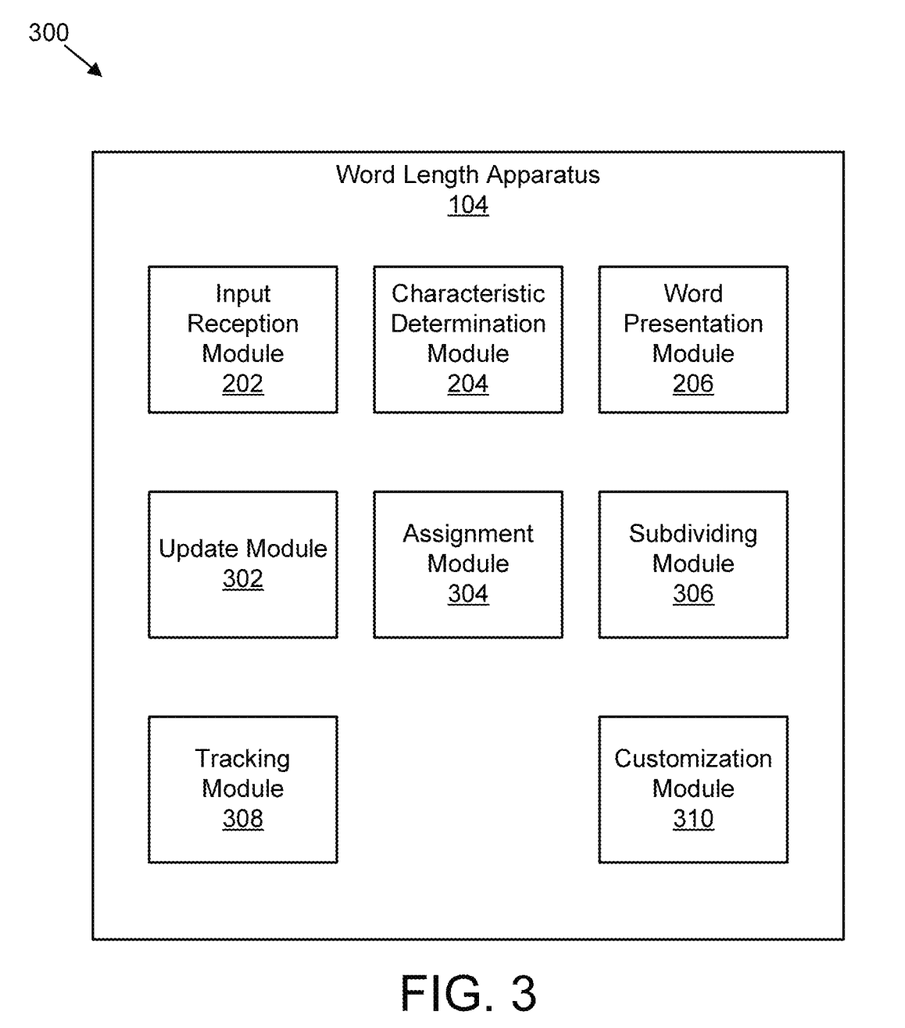
FIG. 3 is a schematic block diagram illustrating another embodiment of an apparatus for indicating a word length using an input device in accordance with the present subject matter.

FIG. 3 depicts another embodiment of an apparatus 300 for indicating a word length using an input device. In one embodiment, the apparatus 300 includes a word length apparatus 104. The word length apparatus 104, in certain embodiments, includes an input reception module 202, a characteristic determination module 204, and a word presentation module 206, which are substantially similar to the input reception module 202, a characteristic determination module 204, and a word presentation module 206 described with reference to FIG. 2. The word length apparatus 104, in a further embodiment, includes an update module 302, an assignment module 304, a subdividing module 306, a tracking module 308, and a customization module 310, which are described below.

The word length apparatus 104, in one embodiment, includes an update module 302 configured to update the list of one or more words in response to modification of one or more characteristics of the received input. In certain embodiments, the indicated word length is modified in response to modification of one or more characteristics of the received input. For example, a user may input a left-swiping gesture that indicates a ten-character word length based on the distance of the swiping gesture, as determined by the characteristic determination module 204. The word presentation module 206 may present a list of one or more words that have a word length substantially corresponding to the indicated word length. As part of the same swiping gesture, the user may then swipe back to the right to decrease the indicated word length (e.g., to five-character words), which would signal the update module 302 to update the word list to display words having a length indicated by the updated swiping gesture.

In one embodiment, the update module 302 dynamically updates the list of words as one or more characteristics of the received input changes. In another embodiment, the update module 302 updates the list in response to a period of time elapsing after modification of the characteristics of the received input. In certain embodiments, the word presentation module 206 updates the list of one or more words in response to the update module 302 detecting an update should occur.

In another embodiment, the word length apparatus 104 includes an assignment module 304 configured to assign a word length to one or more characteristics of the received input. For example, the assignment module 304 may assign a word length to one or more characteristics of a hovering gesture, such as the duration of the hovering gesture. Thus, the assignment module 304 may associate a one-second hover with a three-character word length, a two-second hover with a four-character word length, and so on.

In certain embodiments, the assignment module 304 assigns the word length based on one or more usage patterns associated with the received input, such as a user's swiping patterns, hovering patterns, tapping patterns, and/or the like. For example, a user may try to swipe a default distance representing a five-character word length, but consistently swipe too far (e.g., to a six-character word length) and have to swipe back to a five-character word length. In this situation, the assignment module 304, based on the user's swiping patterns (e.g. swiping back to a five-character word length after swiping to a six-character word length) may assign the five-character length to the consistently mistaken swipe distance (e.g., the distance representing the six-character word length).

In certain embodiments, the assignment module 304 assigns new word lengths to a plurality of input characteristics representing a default word length, such as swipe distance or tap duration, based on the user's usage of the input gestures. Thus, one or more default swipe distances may be assigned new word lengths based on the swiping patterns of the user. Alternatively, the default word length associated with a tap duration and/or force may be modified based on the user having to correct their tap duration and/or force to produce the desired word length.

In one embodiment, the word length apparatus 104 includes a subdividing module 306 configured to subdivide the view area of a display of the information handling device, such as a touch-enabled display, into one or more segments representing a word length. In another embodiment, as a received input moves into a word length segment from a different word length segment, the list of words presented by the word presentation module 206 is updated. In certain embodiments, the subdividing module 306 subdivides the total viewing area of the touch-enabled display into one or more word length segments. For example, if a user begins a swiping gesture, the subdividing module 306 may subdivide the viewing are of the touch-enabled display into word length segments based on the location and direction of the swiping gesture. In certain embodiments, the subdividing module 306 displays visible boundaries that divide the different view area segments and act as guides for the user.

In another embodiment, the subdividing module 306 subdivides a portion of the viewing area of the display. For example, the subdividing module 306 may only subdivide the portion of the display above the virtual keyboard to receive input gestures. Thus, a gesture, such as a swiping gesture, that is performed outside the viewing area of the display directly above the virtual keyboard would not be recognized and the gesture would not modify the indicated word length.

In one embodiment, the subdividing module 306 subdivides the viewing area of the display into segments representing a single word length. For example, one segment may represent two-letter words, another three-letter words, and so on. In some embodiments, the subdividing module 306 subdivides the viewing area of the display into segments representing word length groups, such as short, medium, long, or the like. Thus, on information handling devices 102 having small displays, such as a smart phone, the subdividing module 306 may group word lengths together to efficiently utilize the viewing area of the display. A short word length group, for example, may include words having three- and four-letter lengths, the medium group may include words having five- and six-letter lengths, and the long word length group may include any words with a length greater than six letters.

In another embodiment, the subdividing module 306 subdivides the viewing area of the display based on usage patterns of the user. For example, if a user consistently swipes to a five-letter word length, the subdividing module 306 may increase the area of the five-letter word length segment of the viewing area such that it is easier for the user to swipe to. The subdividing module 306, in certain embodiments, linearly aligns the word length segments, e.g., three-letter segment, followed by four-letter segment, and so on. In another embodiment, the subdividing module 306 aligns word length segments of the viewing area based on the user's usage patterns. Thus, more-frequently used word lengths may be closer to an initial swipe position than less-frequently used word lengths. In another embodiment, the subdividing module 306 subdivides the viewing area into word length segments based on a logarithmic calculation such that word lengths that are statistically more-frequently used are easier to reach than other statistically less-frequently used word lengths.

The word length apparatus 104, in a further embodiment, includes a tracking module 308 configured to track the usage frequency of one or more words having a particular length. In certain embodiments, the tracking module 308 keeps track of the words that are selected from the list presented by the word presentation module 206. In one embodiment, the tracking module 308 is in communication with the server 108 and stores the word usage data in a data store, such as a database, on the server 108. In another embodiment, the tracking module 308 stores word usage data locally on the information handling device 102.

In certain embodiments, the word presentation module 206 sorts the list of one or more words based on a usage frequency distribution determined by the tracking module 308, such that more-frequently used words are listed before less-frequently used words. The tracking module 308, in some embodiments, tracks the types of received inputs that are used, such as a swipe, a hover, a tap-and-hold, and/or the like. In another embodiment, the tracking module 308 tracks one or more characteristics associated with the input gestures (e.g., the duration, distance, or the like of the input gesture), most commonly used words entered by a user and/or selected from the list, and/or the like.

In certain embodiments, the word length apparatus 104 includes a customization module 310 configured to customize one or more settings associated with the word length apparatus 104. For example, the customization module 310 may set the types of gestures that are recognizable by input reception module 202. In one embodiment, the customization module 310 may set the word lengths that are recognizable and will cause the word presentation module 206 to present the list of one or more words. For example, a user may not need to see a list of words with a length less than four letters or greater than ten letters. Other settings customizable by the customization module 310 may include how to sort the word list, where to display the word list, how to subdivide the word length segments of the viewing area, and/or the like.

Figure 4A:
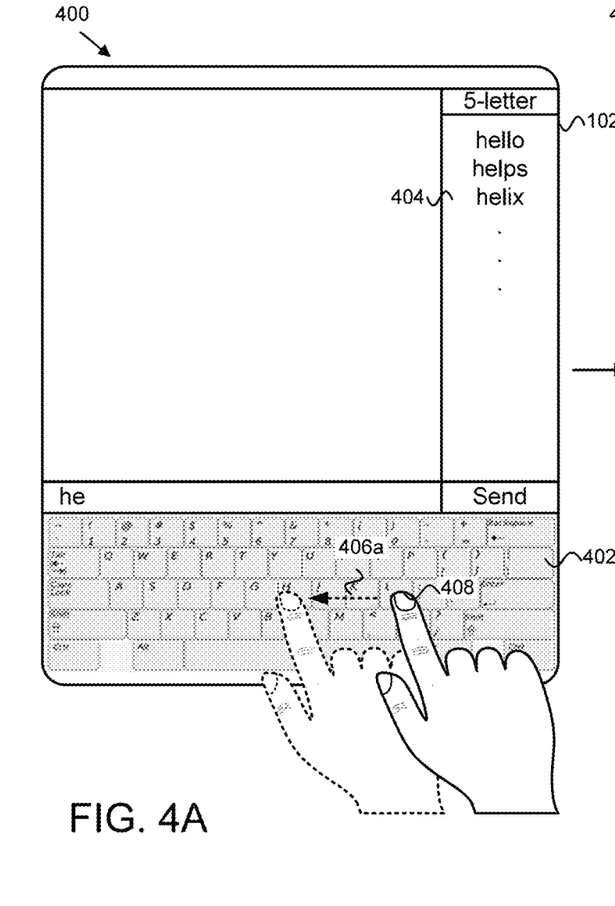
FIG. 4A illustrates one embodiment of indicating a word length using an input device in accordance with the present subject matter.

FIG. 4A depicts one embodiment 400 of indicating a word length using an input device. As depicted in FIG. 4A, the received input comprises a swiping gesture using a finger 408 of the user on a virtual keyboard 402 of an information handling device 102. As shown, the user has already entered "he" on the virtual keyboard 402. The user may like to enter an "l" and then bring up a list of words that begin with the letters "hel" and have a five-letter word length instead of entering every letter of the word. Thus, the user begins a swiping gesture on the letter "l" and swipes a distance 406a to the left representing a word length of five letters. The input reception module 202 may receive the swiping gesture and the characteristic determination module 204 may determine the distance 406a of the swiping gesture in order to determine an indicated word length. In some embodiments, other characteristics of the swiping gesture determine the indicated word length, such as swipe speed, swipe intensity, and/or the like.

In response to the characteristic determination module 204 determining an indicated word length based on the input gesture, the word presentation module 206 may present a list 404 of one or more words having a word length substantially corresponding to the indicated word length. Thus, based on the letters "hel," the word presentation module 206 may present a list of five-letter words starting with "hel," such as "hello," "helps," "helix," and so on. The word presentation module 206, in some embodiments, sorts the list such that more commonly used words or more frequently used words are listed near the top of the list. In one embodiment, the list is scrollable if there are more words in the list than can be displayed in the view area. In another embodiment, the word presentation module 206 presents the list of words in an anchored position at one point on the screen. In a further embodiment, the list of words is presented on the display in response to the input reception module 202 receiving an input gesture. In some embodiments, the position of the list of words may be changed by dragging the list to a position on the screen that is more convenient for the user.

Figure 4B:
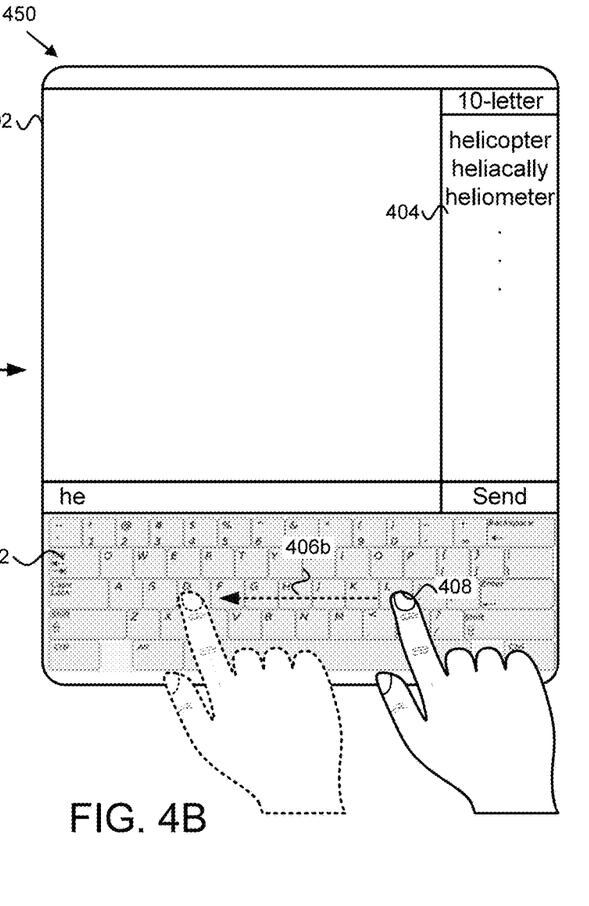
FIG. 4B illustrates another embodiment of indicating a word length using an input device in accordance with the present subject matter.

As depicted in the embodiment 450 in FIG. 4B, as the user continues to swipe in the same direction as the initial swiping gesture, the list 404 of words is updated based on the new swiping distance 406b, which in this case would represent a ten-letter word length. As in FIG. 4A, the word presentation module 206 may update the list with words starting with "hel" and having a length of ten letters, such as "helicopter," "heliacally," "heliometer," and so on. The user may swipe further to the left or back to the right to further update the list of words until a desired word length is determined. In one embodiment, an update module 302 dynamically updates the word list as one or more characteristics of the received input is modified. In another embodiment, the update module 302 updates the word list in response to a predetermined period of time expiring after one or more characteristics of the received input has been modified.

Figure 5A:
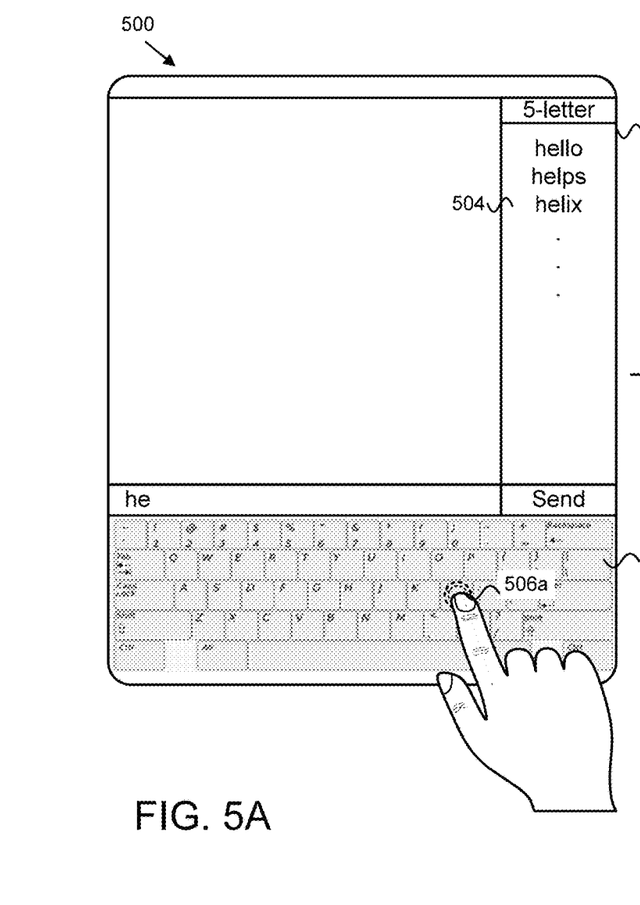
FIG. 5A illustrates a further embodiment of indicating a word length using an input device in accordance with the present subject matter.

FIG. 5A depicts a further embodiment 500 of indicating a word length using an input device 506a, which is substantially similar to the embodiment 400 depicted in FIG. 4A. FIG. 5A depicts a tap-and-hold input gesture 506a on the virtual keyboard 502 of an information handling device 102. The input reception module 202 may receive the input gesture 506a and a characteristic determination module 204 may determine the duration and/or force of the tap-and-hold gesture 506a. Based on the duration and/or force of the tap-and-hold gesture 506a, an indicated word length is determined and the word presentation module 206 presents a list 504 of words having a length determined according to the indicated word length, in this case five letters. In some embodiments the word presentation module 206 may present words in the list 504 that correspond to a word length group, such as short words, medium-length words, and long words based on the duration and/or force of the tap-and-hold input gesture.

Figure 5B:
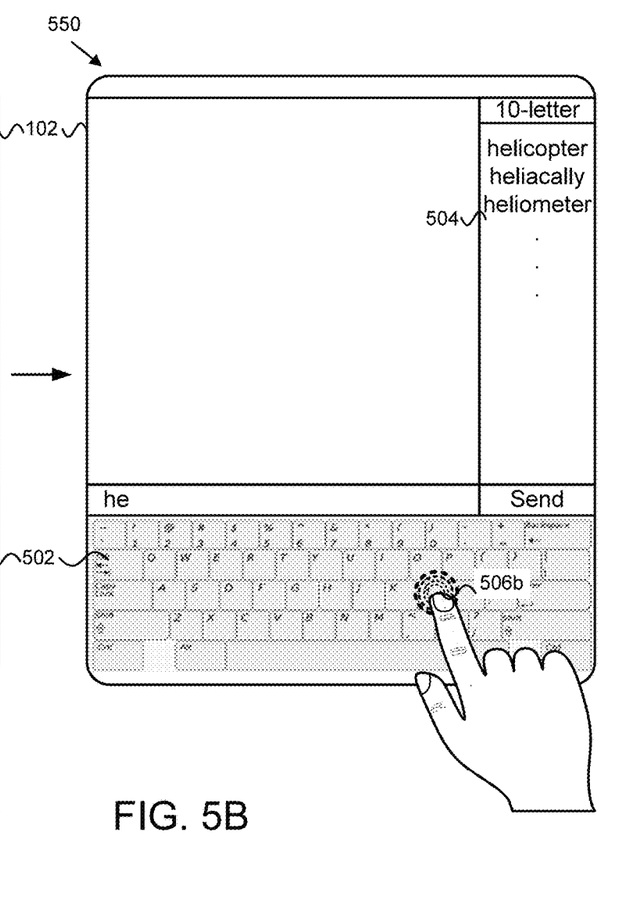
FIG. 5B illustrates yet another embodiment of indicating a word length using an input device in accordance with the present subject matter.

As depicted in the embodiment 550 in FIG. 5B, as the user continues the tap-and-hold gesture 506b, increasing the duration and/or force of the tap-and-hold gesture 506b, an update module 302 may update the list 504 of words to show words that have a word length substantially corresponding to the one or more modified characteristics of the input gesture 506b. The user, in order to display words having a shorter word length, may decrease the amount of force of the tap-and-hold gesture 506b. In another embodiment, the word presentation module 206 may cancel or clear the word list 504 in response to the user ceasing the tap-and-hold gesture 506b.

A hovering input gesture, in one embodiment, functions the same as the embodiments in FIGS. 4A-5B, except the input reception module 202 would not receive a touch input, but instead would receive a hover input gesture. The hover input gesture may include one or more characteristics that include a swiping gesture parallel to the touch-enabled display, a gesture indicating a perpendicular distance away from the touch-enabled display, and a hovering duration.

Figure 6:
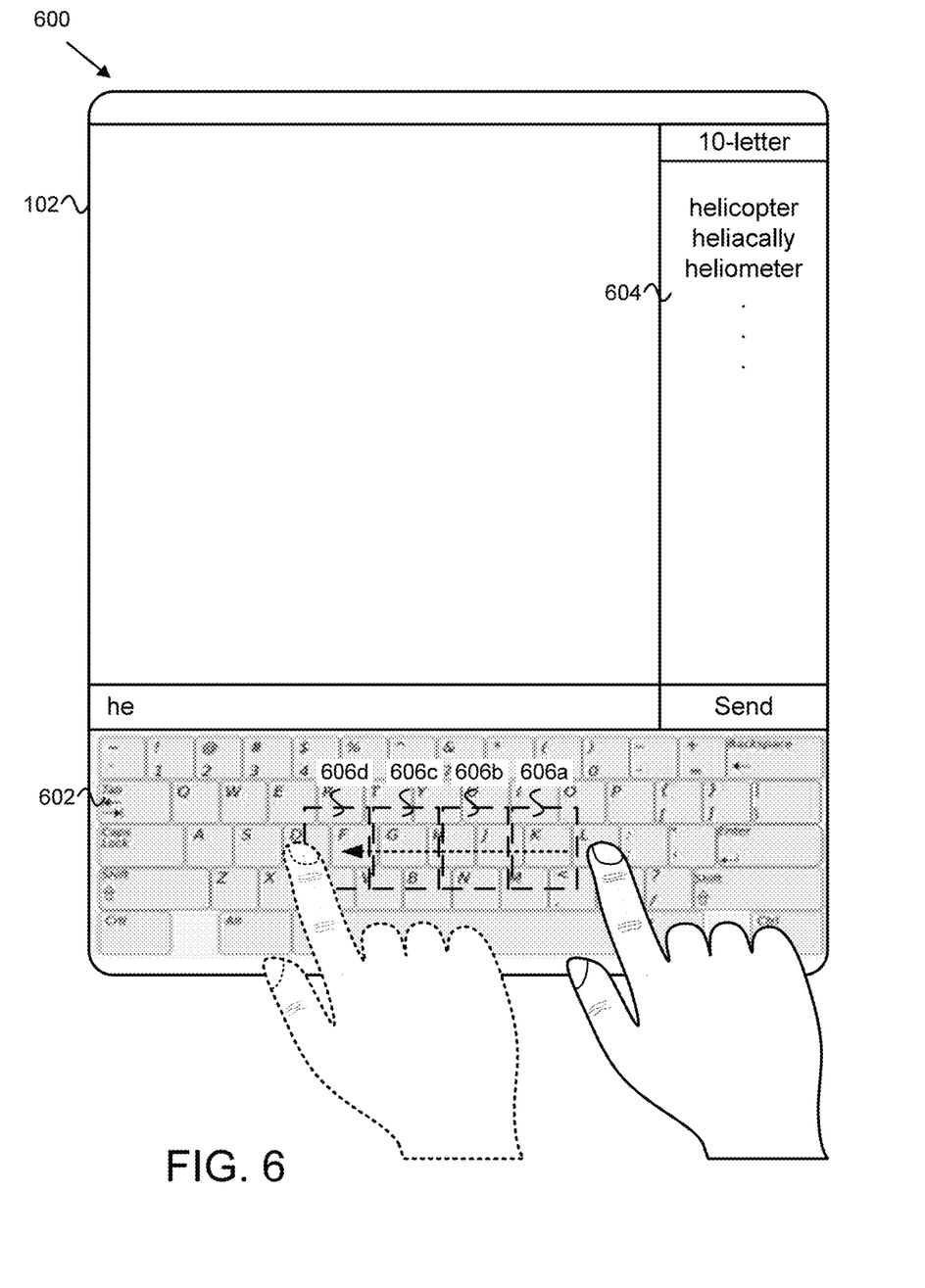
FIG. 6 illustrates one embodiment of indicating a word length using an input device in accordance with the present subject matter

FIG. 6 depicts one embodiment 600 of indicating a word length using an input device. In the depicted embodiment, a subdividing module 306 subdivides the view are of the display of the information handling device 102 above the virtual keyboard 602 into a plurality of word length segments 606a-d. In the depicted embodiment, as the user swipes through the different word length segments 606a-d, the list 604 of words may be updated to display words with lengths substantially corresponding to the word lengths represented by the word length segments. For example, segment 1 606a may represent three- and four-letter words, segment 2 606b may represent five- and six-letter words, and so on. In certain embodiments, the subdividing module 306 visually presents the boundaries of the word length segments, which acts as a guide for the user.

In some embodiments, the subdividing module 306 may create word length segments 606a-d that are substantially the same size (e.g., the same width). In another embodiment, the subdividing module 306 may create word length segments 606a-d that have different sizes. In certain embodiments, the size of the word length segments 606a-d is based on the usage patterns of the user. For example, if the user swipes into segment 3 606c more often than the other segments 606a, 606b, 606d, the subdividing module 306 may make segment 3 606c wider than the other segments 606a, 606b, 606d to make it more convenient for the user.

In one embodiment, if the user frequently swipes the wrong distance and consistently has to correct by swiping back a certain distance, the assignment module 304 assigns desired word length to the frequently-used swiping distance such that the user does not have to consistently correct his swiping gesture. The subdividing module 306 may use this information to set the sizes of the word length segments. Thus, if a user frequently swipes into segment 4 606d, but really wants a word length associated with segment 3 606c, instead of having to swipe back into segment 3 606c, the subdividing module 306 may resize segment 3 606c such that the user does not have to consistently correct their swiping gesture.

Figure 7:
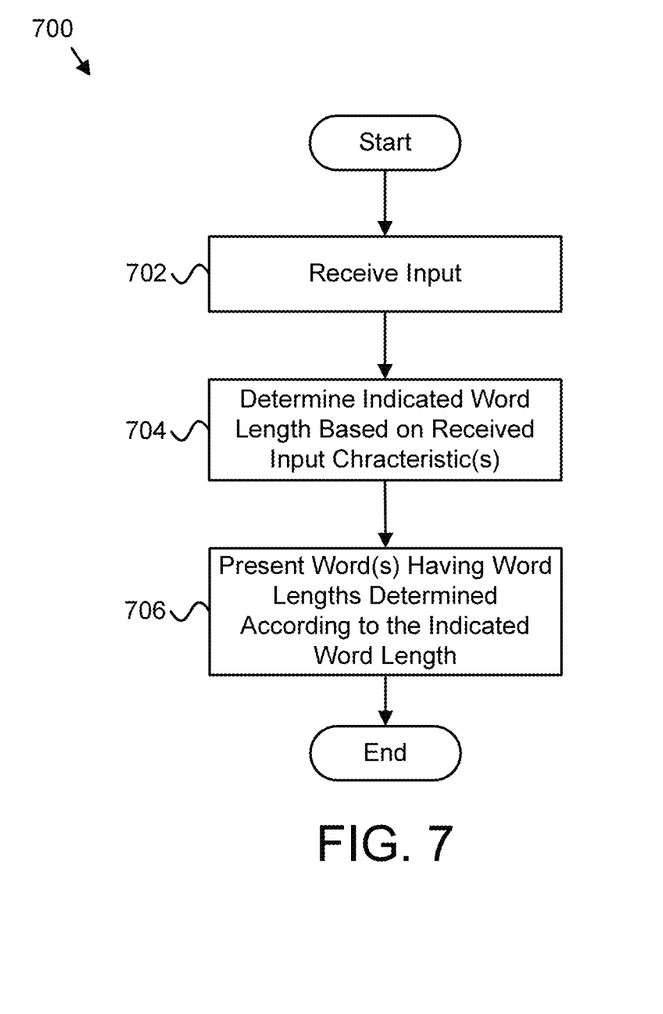
FIG. 7 is a schematic flow chart diagram illustrating one embodiment of a method for indicating a word length using an input device in accordance with the present subject matter.

FIG. 7 depicts one embodiment of a method 700 for indicating a word length using an input device. In one embodiment, the method 700 begins and an input reception module 202 receives 702 an input from an input device, such as a touch-enabled display, a mouse, a track pad, or the like, interacting with a virtual keyboard. In certain embodiments, the virtual keyboard is presented on a touch-enabled display of an information handling device 102. The input, in certain embodiments, includes an input gesture such as a swiping gesture, a hovering gesture, a tap-and-hold gesture, and/or the like. In another embodiment, a characteristic determination module 204 determines 704 one or more characteristics of the received input. In one embodiment, the one or more characteristics of the received input indicates a word length. In some embodiments, a word presentation module 206 presents 706 a list of one or more words that have word lengths determined according to the indicated word length and the method 700 ends.

Figure 8:
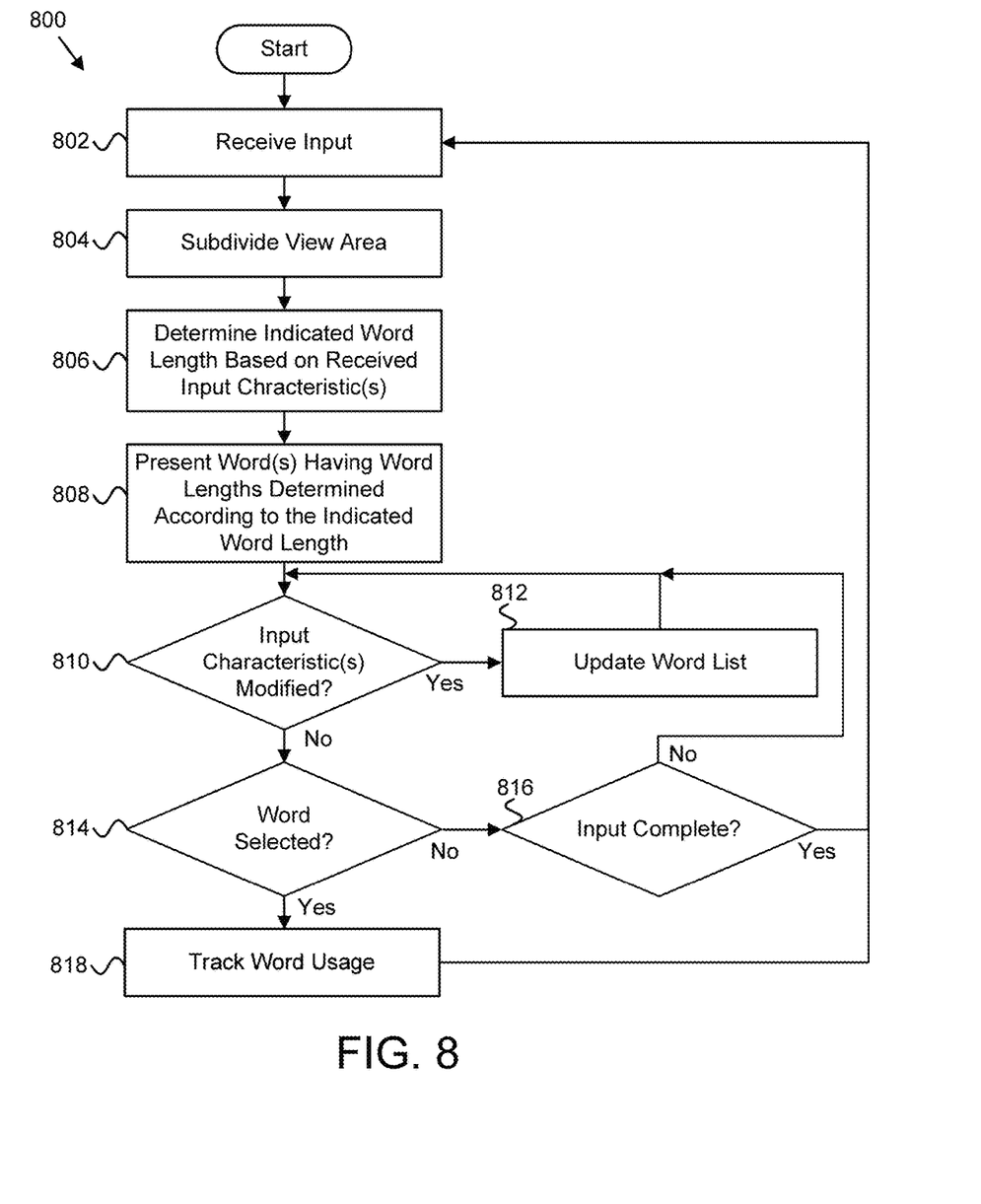
FIG. 8 is a schematic flow chart diagram illustrating another embodiment of a method for indicating a word length using an input device in accordance with the present subject matter.

FIG. 8 depicts another embodiment of a method 800 for indicating a word length using an input device. In one embodiment, the method 800 begins and an input reception module 202 receives 802 an input from an input device. The input, in certain embodiments, includes an input gesture such as a swiping gesture, a hovering gesture, a tap-and-hold gesture, and/or the like. In another embodiment, a subdividing module 306 subdivides 804 a viewing area of a display of an information handling device 102 into one or more segments representing different word lengths. In some embodiments, each word length segment represents a specific word length, such as three-letters, four-letters, and so on. In a further embodiment, each word length segment represent a group of word lengths, which may be classified as short, medium, long, or the like. For example, the short word length segment may include three- and four-letter words, the medium word length segment may include five- and six-letter words, and so on.

In one embodiment, a characteristic determination module 204 determines 806 a word length indicated by one or more characteristics of the received input. For example, the characteristics may include a swiping distance, a tapping duration and/or force, a hovering duration, and/or the like. A word presentation module 206, in a further embodiment, presents 808 one or more words having word lengths determined according to the indicated word length. In one embodiment, the word presentation module 206 presents 808 words in a sorted order, such as alphabetically or the like. In another embodiment, the word presentation module 206 presents 808 words based on the usage frequency of the words. For example, a tracking module 308 may track 820 the word usage when a user selects a word from the list and/or when a user enters a word on the virtual keyboard. More-frequently used words may be presented near the top of the list before less-frequently used words. Alternatively, the word presentation module 206 may present 808 more-commonly used words near the top of the list before less-commonly used words.

In one embodiment, an update module 302 determines 810 whether one or more characteristics of the received input has been modified. In certain embodiments, if the update module 302 determines 810 a characteristic has been modified, indicating a new word length, the update module 302 updates 812 the word list presented 808 by the word presentation module 206 to display words having a word length substantially corresponding to the indicated word length. In another embodiment, if the update module 302 determines 810 one or more characteristics has not been modified, a tracking module 308 determines 814 whether the user has selected a word from the list. In a further embodiment, if the tracking module 308 determines 814 that a word has not been selected, the input reception module 202 determines 816 whether the input gesture is complete. In one embodiment, if the input reception module 202 determines 816 that the input gesture is not complete, the update module 302 continues to determine 810 whether the characteristics of the gesture have been modified. Otherwise, in another embodiment, if the input reception module 202 determines 816 that the input gesture is complete, the input reception module 202 continues to receive 802 input gestures. If the tracking module 308, in a further embodiment, determines 814 that a word has been selected from the list, the tracking module 308 tracks 818 the selected word and the input reception module 202 continues to receive 802 input gestures.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting a gesture from a single input item on a touch-enabled display of an input device, the gesture input comprising a swipe gesture;
   determining a location on the touch-enabled display where the swipe gesture begins and a direction of the swipe gesture;
   dynamically subdividing a view area of the touch-enabled display into one or more segments based on the location and the direction of the swipe gesture, wherein each segment represents a particular word length;
   detecting the swipe gesture move into a first segment of the one or more segments;
   presenting a list of one or more words that each have a word length determined according to the word length indicated by the first segment;
   detecting the swipe gesture move into a second segment of the one or more segments; and
   dynamically updating the presented list of one or more words with one or more different words in response to detecting the swipe gesture move into the second segment and in response to a period of time elapsing after modification of the swipe gesture, the one or more different words each having a word length that corresponds to the word length indicated by the second segment.

2. The method of claim 1, further comprising assigning a word length to one or more characteristics of the received input, the word length being assigned based on one or more usage patterns associated with the received input.

3. The method of claim 1, wherein subdividing the view area of the touch-enabled display comprises a subdivision selected from the group consisting of linearly subdividing the view area and logarithmically subdividing the view area based on one or more usage patterns associated with the received input gesture.

4. The method of claim 1, wherein the input comprises a hover gesture, one or more characteristics of the hover gesture comprising one or more of a duration, a perpendicular distance between a hovering item and the touch-enabled display, and a parallel distance between a hovering gesture start position and a hovering gesture end position.

5. The method of claim 1, wherein the input comprises a tap-and-hold gesture having one or more characteristics indicating a word length, the one or more characteristics comprising one or more of a duration and a force.

6. The method of claim 1, further comprising tracking a usage frequency of one or more words having a particular length, the list of one or more words being sorted based on a usage frequency distribution such that more-frequently used words are listed before less-frequently used words.

7. The method of claim 1, wherein the input is received from a virtual keyboard, the virtual keyboard presented on a touch-enabled display of an information handling device and wherein the one or more words presented in the list begin with one or more characters entered on the virtual keyboard, an order of the one or more entered characters being preserved in the one or more listed words.

8. An apparatus comprising:
a processor;
a memory storing machine readable code executable by the processor, the machine readable code comprising:
an input reception module configured to detect a gesture from a single touch input item on a touch-enabled display of an input device, the gesture input comprising a swipe gesture;
a characteristic determination module configured to determine a location on the touch-enabled display where the swipe gesture begins and a direction of the swipe gesture;
a subdividing module configured to dynamically subdivide a view area of the touch-enabled display into one or more segments based on the location and the direction of the swipe gesture, wherein each segment represents a particular word length, and wherein visible boundaries representing each segment are displayed on the touch-enabled display;
a word presentation module configured to present a list of one or more words having word lengths determined in response to detecting the swipe gesture move into a first segment of the one or more segments; and
an update module configured to dynamically update the presented list of one or more words with one or more different words having different word lengths indicated by the second segment in response to detecting the swipe gesture move into a second segment of the one or more segments and in response to a period of time elapsing after modification of the swipe gesture.

9. The apparatus of claim 8, further comprising an assignment module configured to assign a word length to one or more characteristics of the received input, the word length being assigned based on one or more usage patterns associated with the received input.

10. The apparatus of claim 8, wherein the one or more characteristics of the swiping gesture comprises one or more of a swiping distance and a swiping speed.

11. The apparatus of claim 8, wherein the input comprises a hover gesture, one or more characteristics of the hover gesture comprising one or more of a duration, a perpendicular distance between a hovering item and the touch-enabled display, and a parallel distance between a hovering gesture start position and a hovering gesture end position.

12. The apparatus of claim 8, wherein the input comprises a tap-and-hold gesture having one or more characteristics indicating a word length, the one or more characteristics comprising one or more of a duration and a force.

13. The apparatus of claim 8, further comprising a tracking module configured to track a usage frequency of one or more words having a particular length, the list of one or more words being sorted based on a usage frequency distribution such that more-frequently used words are listed before less-frequently used words.

14. The apparatus of claim 8, wherein the input is received from a virtual keyboard, the virtual keyboard presented on a touch-enabled display of an information handling device and wherein the one or more words presented in the list begin with one or more characters entered on the virtual keyboard, an order of the one or more entered characters being preserved in the one or more listed words.

15. A program product comprising a computer readable storage medium storing machine readable code executable by a processor to perform:
detecting a gesture from a single touch input item on a touch-enabled display of an input device, the gesture input comprising a swipe gesture;
determining a location on the touch-enabled display where the swipe gesture begins and a direction of the swipe gesture;
dynamically subdividing a view area of the touch-enabled display into one or more segments based on the location and the direction of the swipe gesture, wherein each segment represents a particular word length;
displaying visible boundaries representing each segment on the touch-enabled display;
detecting the swipe gesture move into a first segment of the one or more segments;
presenting a list of one or more words having word lengths determined according to the word length indicated by the first segment;
detecting the swipe gesture move into a second segment of the one or more segments; and
dynamically updating the presented list of one or more words with one or more different words having different word lengths indicated by the second segment in response to detecting the swipe gesture move into the second segment and in response to a period of time elapsing after modification of the swipe gesture.

* * * * *